(12) United States Patent
Hawkins

(10) Patent No.: US 9,646,382 B2
(45) Date of Patent: May 9, 2017

(54) METHOD, SYSTEM AND APPARATUS FOR PROVIDING IMPROVED AUDIENCE PARTICIPATION

(71) Applicants: Sony Corporation, Tokyo (JP); Sony Europe Limited, Weybridge (GB)

(72) Inventor: Paul Hawkins, Shawford (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 20 days.

(21) Appl. No.: 14/790,812

(22) Filed: Jul. 2, 2015

(65) Prior Publication Data
US 2016/0125242 A1    May 5, 2016

(30) Foreign Application Priority Data
Nov. 3, 2014 (GB) .................................. 1419545.7

(51) Int. Cl.

| G06K 9/00 | (2006.01) |
| G06T 7/00 | (2017.01) |
| G06K 9/46 | (2006.01) |
| G06Q 99/00 | (2006.01) |
| A63F 13/00 | (2014.01) |

(52) U.S. Cl.
CPC .......... *G06T 7/0044* (2013.01); *G06K 9/4604* (2013.01); *G06K 9/4652* (2013.01); *G06Q 99/00* (2013.01)

(58) Field of Classification Search
USPC ....... 382/100, 103, 106–107, 162, 165, 168, 382/173, 181, 190–192, 199, 203, 209, 382/219, 232, 254, 274, 276, 286–291, 382/305, 312, 170, 118, 104; 463/2, 33; 725/35
See application file for complete search history.

(56) References Cited

U.S. PATENT DOCUMENTS

| 8,406,467 | B2 * | 3/2013 | Fahn ................... | G06K 9/3258 382/103 |
| 2005/0272496 | A1 * | 12/2005 | Reinish ................ | A63B 63/00 463/2 |
| 2008/0008360 | A1 * | 1/2008 | Pattikonda ......... | G06K 9/00228 382/118 |
| 2008/0127253 | A1 * | 5/2008 | Zhang .................. | H04N 21/478 725/35 |
| 2011/0081081 | A1 * | 4/2011 | Smith ................. | G06K 9/00818 382/170 |
| 2013/0058534 | A1 | 3/2013 | Zobel | |
| 2013/0077830 | A1 * | 3/2013 | Liu ..................... | G06K 9/00818 382/104 |
| 2013/0281209 | A1 * | 10/2013 | Lyons ................. | G07F 17/3211 463/33 |

* cited by examiner

*Primary Examiner* — Seyed Azarian
(74) *Attorney, Agent, or Firm* — Oblon, McClelland, Maier & Neustadt, L.L.P.

(57) ABSTRACT

The present disclosure provides an apparatus for detecting placards in a captured image, comprising: input circuitry operable to receive the captured image; detector circuitry operable to detect placards in the captured image on a basis of a predetermined shape and/or color of the placards, the detector circuitry being operable to detect placards of a plurality of different shapes and/or colors; and counter circuitry operable to count a number of detected placards of each different shape and/or color.

11 Claims, 9 Drawing Sheets

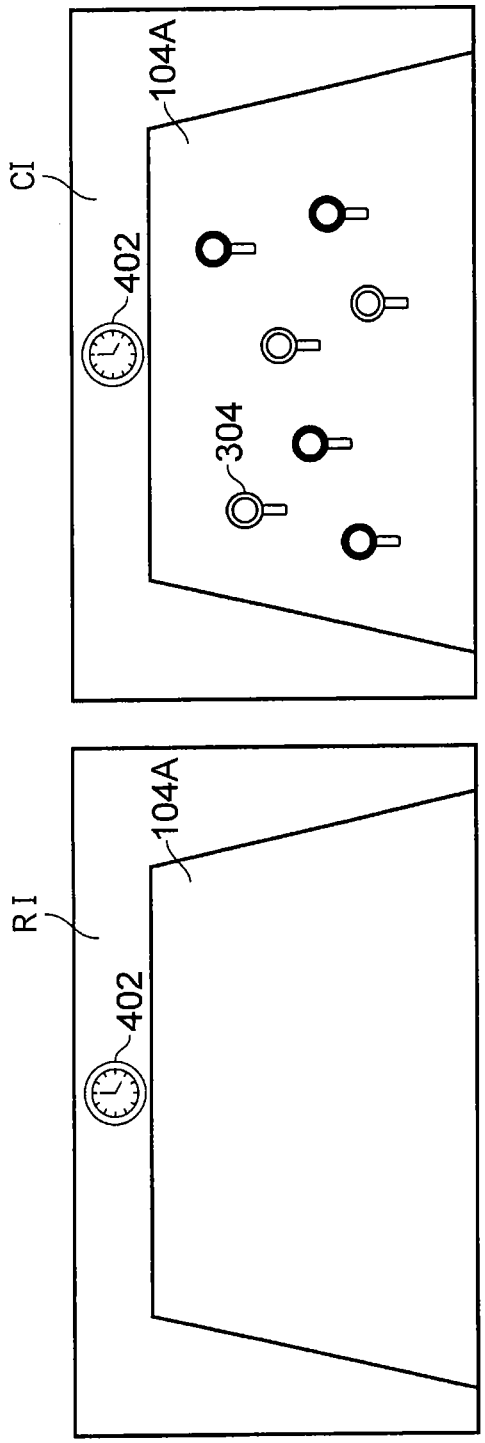
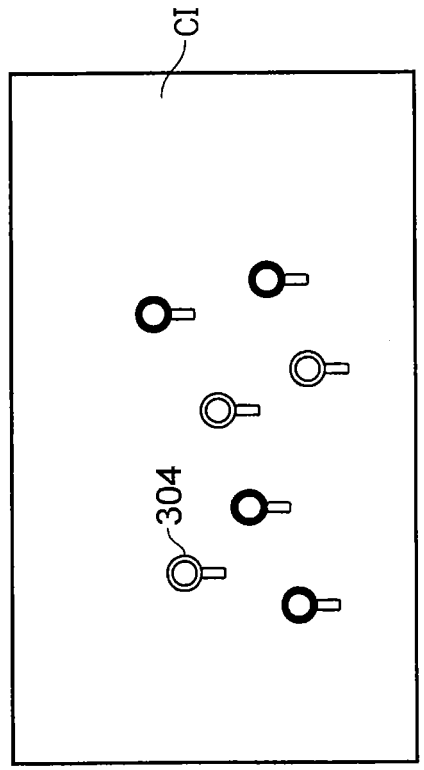
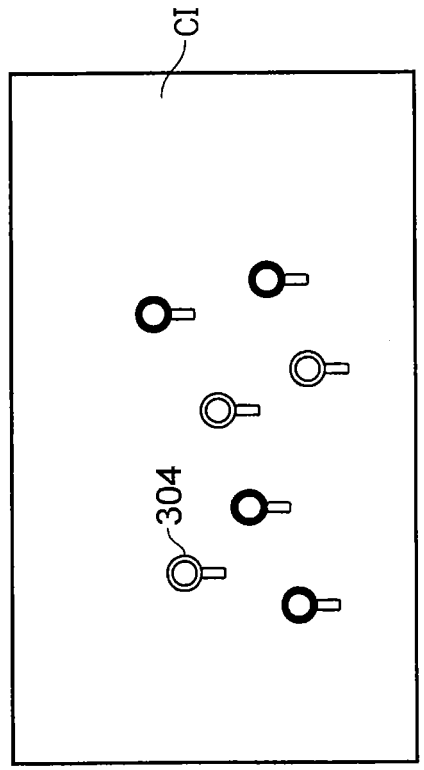
FIG. 4A
FIG. 4B
FIG. 4C

| Block Identifier | Seat Identifier | Round 1 | Round 2 | Round 3 | Round 4 | Round 5 |
|---|---|---|---|---|---|---|
| X2, Y2 | Row 2 Seat 1 | Yes | No | No | No | Yes |
| X5, Y2 | Row 2 Seat 4 | Yes | No | Yes | Yes | Yes |
| X6, Y2 | Row 2 Seat 5 | No | No | Yes | Yes | Yes |
| X3, Y3 | Row 3 Seat 2 | Yes | Yes | No | Yes | No |
| X4, Y3 | Row 3 Seat 3 | Yes | No | No | Yes | Yes |
| X5, Y3 | Row 3 Seat 4 | No | Yes | Yes | Yes | No |
| X6, Y4 | Row 4 Seat 5 | No | No | Yes | No | No |
| Correct Answers | | Yes | Yes | No | Yes | No |

FIG. 7

METHOD, SYSTEM AND APPARATUS FOR PROVIDING IMPROVED AUDIENCE PARTICIPATION

CROSS REFERENCE TO RELATED APPLICATIONS

The present application claims priority to United Kingdom application GB1419545.7 filed on 3 Nov. 2014, the contents of which being incorporated herein by reference in its entirety.

BACKGROUND

Field of the Disclosure

The present disclosure relates generally but not exclusively to a method, system and apparatus for providing improved audience participation.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

At large scale public events (such as sporting events, music events, etc.), modern technology has provided more varied and more innovative ways for audience interaction. For example, such events often have their own social media feeds accessible via the internet on laptops, smartphones, tablets, etc. These allow audience members (both those at the event and those watching the event remotely via, for example, television or the internet) to be constantly updated regarding details of the event, to be provided with content (such as images and videos) relating to the event, and even to instantly share their thoughts and opinions with others. Thanks to this, audience participation in large scale public events is easier and on a larger scale than ever before.

A problem, however, is that the opportunities offered for audience participation by current technology are very much focussed towards audience members who are watching remotely rather than those who are actually at the event (that is, as part of the live audience). For example, although social media feeds are excellent for those watching a televised soccer match from home (meaning that users can get real time score information, can access video highlights of the match, can share their opinion on the match, etc. whilst watching the event on television), they are not as well suited to improving audience interaction for those who are actually part of the live audience. Problems include the fact that the atmosphere at the event is harmed (because many people in the live audience are using devices such as smartphones or tablets rather than actually watching the event) and that some fans find it difficult to participate (for example, fans who are less familiar with devices such as smartphones and tablets, or children who simply do not have them). There can also be extensive technical challenges in trying to make this technology work well for the large numbers of people present at such events (for example, mobile telecommunications cells can become saturated, meaning that internet access is not available, and supplying Wi-Fi internet access to the event may be difficult and expensive).

The present disclosure aims to alleviate the above-mentioned problems. In particular, the present disclosure aims to provide a technical solution for allowing improved event interaction for audience members present at large scale public events.

SUMMARY

The present disclosure provides an apparatus for detecting placards in a captured image, comprising: input circuitry operable to receive the captured image; detector circuitry operable to detect placards in the captured image on a basis of a predetermined shape and/or colour of the placards, the detector circuitry being operable to detect placards of a plurality of different shapes and/or colours; and counter circuitry operable to count a number of detected placards of each different shape and/or colour.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 4A-C describe the subtraction of a reference image from the captured image, according to an embodiment;

FIG. 7 shows a table of results for a game implemented using the cameras and apparatus, according to an embodiment;

DESCRIPTION OF THE EMBODIMENTS

Figure 1:
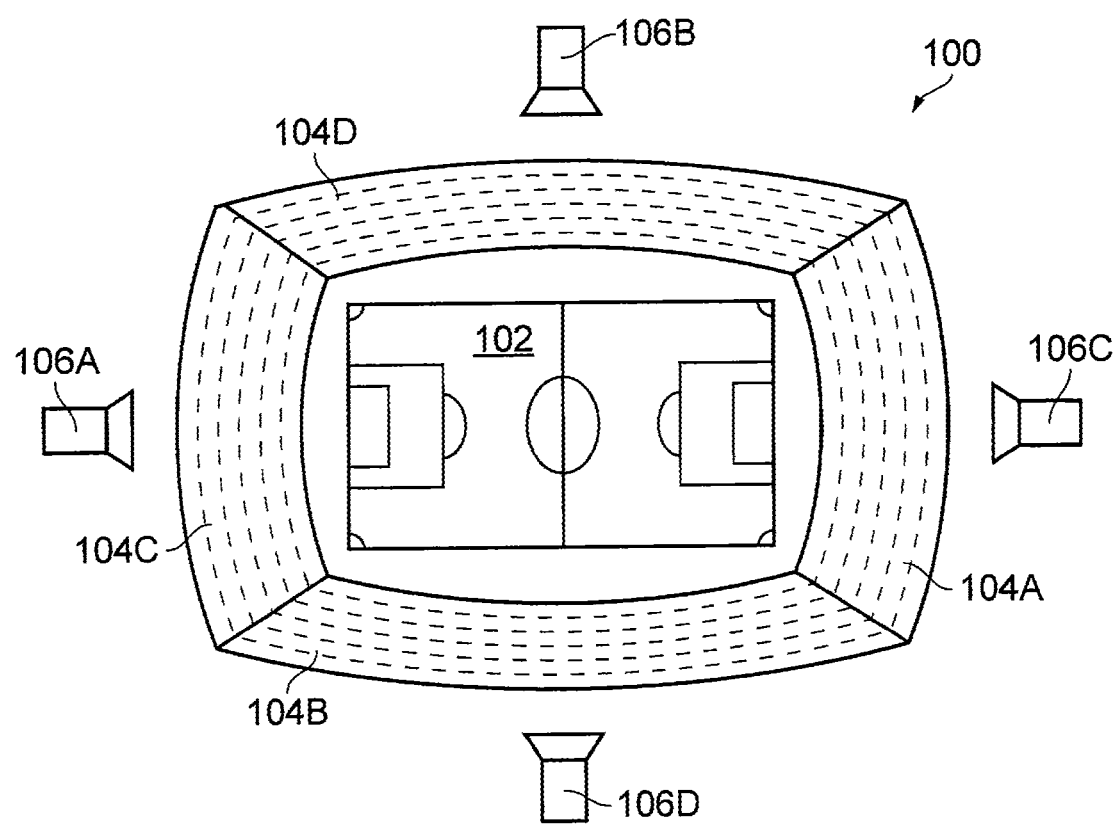
FIG. 1 describes an arrangement of cameras in a stadium according to an embodiment.

The present disclosure provides an apparatus for detecting placards in a captured image, comprising: input circuitry operable to receive the captured image; detector circuitry operable to detect placards in the captured image on a basis of a predetermined shape and/or colour of the placards, the detector circuitry being operable to detect placards of a plurality of different shapes and/or colours; and counter circuitry operable to count a number of detected placards of each different shape and/or colour.

Advantageously, this arrangement allows members of a live audience at an event to vote on issues relating to the event by holding up placards. The placards are captured and detected in an image, allowing votes on the basis of the placards to be detected and counted. The participation of the live audience and their enjoyment of the event can therefore be improved.

In an embodiment, the detector circuitry comprises shape detector circuitry operable to detect objects in the captured image matching a predetermined placard shape, and colour detector circuitry operable to detect which of the objects detected by the shape detector circuitry match a predetermined placard colour, wherein an object detected by the colour detector circuitry is determined to be a detected placard.

Advantageously, this ensures that only objects in the captured image which match a predetermined placard shape and colour are detected as placards. This reduces the risk of a non-placard object in the captured image being mistakenly identified as a placard, thus improving the accuracy of the placard detection.

In an embodiment, there is a single predetermined placard shape, and a plurality of different predetermined placard colours, wherein the counter circuitry is operable to count the number of detected placards of each different predetermined placard colour.

Advantageously, the use of a single predetermined placard shape makes placard detection easier. The use of a plurality of different predetermined placard colours simultaneously helps accurate detection of placards (since a non-placard object matching the predetermined placard shape but not matching one of the predetermined placard colours will not be identified as a placard) and the differentiation of different votes (for example, a first predetermined placard colour may represent a "yes" vote and a second predetermined placard colour may represent a "no" vote).

In an embodiment, the single predetermined placard shape is a circle, oval or ellipse, and each predetermined placard colour is different coloured pattern, each coloured pattern comprising a central circular, oval or elliptical region in a first colour surrounded by a circular, oval or elliptical ring in a second, different colour.

Advantageously, the use of such a single predetermined placard shape and of such predetermined placard colours results in improved placard detection and vote differentiation.

In an embodiment, the apparatus comprises: a storage medium operable to store a reference image of the same scene as that of the captured image, wherein no placards are present in the reference image; and image subtraction unit circuitry operable to subtract the reference image from the captured image prior to detection of placards in the captured image by the detector circuitry.

Advantageously, the subtraction of the reference image helps to remove non-placard objects from the captured image prior to placard detection being carried out. This reduces the risk of a non-placard object in the captured image being mistakenly detected as a placard.

In an embodiment, the captured image is an image of seats in a stadium, and the apparatus comprises mapping circuitry operable to: divide the captured image into a plurality of blocks, wherein each seat in the image corresponds to a respective block; for each block, determine whether or not a detected placard is positioned within the block; and for each block in which a detected placard is determined to be positioned, map the seat corresponding to the block to the shape and/or colour of the detected placard.

Advantageously, this allows a vote made on the basis of the specific shape and/or colour of a placard to be associated with a particular seat in a stadium. This allows the vote(s) of a particular audience member to be tracked, thus providing improved audience participation and enjoyment during voting games or the like.

The present-disclosure also provides a system comprising the apparatus and a camera operable to capture an image and to transmit the captured image to the input circuitry of the apparatus.

In an embodiment, the camera is located at an event with an audience and is operable to capture an image of one or members of the audience each holding up a placard.

The present disclosure also provides a method for detecting placards in a captured image, comprising: receiving the captured image; detecting placards in the captured image on a basis of a predetermined shape and/or colour of the placards, wherein placards of a plurality of different shapes and/or colours are detected; and counting a number of detected placards of each different shape and/or colour.

In an embodiment, the detecting step comprises detecting objects in the captured image matching a predetermined placard shape, and detecting which of the detected objects matching a predetermined placard shape match a predetermined placard colour, wherein a detected object matching a predetermined placard colour is determined to be a detected placard.

In an embodiment, there is a single predetermined placard shape, and a plurality of different predetermined placard colours, wherein the counting step comprises counting the number of detected placards of each different predetermined placard colour.

In an embodiment, the single predetermined placard shape is a circle, oval or ellipse, and each predetermined placard colour is different coloured pattern, each coloured pattern comprising a central circular, oval or elliptical region in a first colour surrounded by a circular, oval or elliptical ring in a second, different colour.

In an embodiment, the method comprises subtracting a reference image from the captured image prior to detection of placards in the captured image, wherein the reference image is an image of the same scene as that of the captured image, wherein no placards are present in the reference image.

In an embodiment, the captured image is an image of seats in a stadium, and the method comprises: dividing the captured image into a plurality of blocks, wherein each seat in the image corresponds to a respective block; for each block, determining whether or not a detected placard is positioned within the block; and for each block in which a detected placard is determined to be positioned, mapping the seat corresponding to the block to the shape and/or colour of the detected placard.

The present disclosure also provides a program for controlling a computer to perform the method.

The present disclosure also provides a recording medium storing the program.

The present disclosure also provides an apparatus, system or method as hereinbefore described with reference to the accompanying drawings.

Referring now to the drawings, wherein like reference numerals designate identical or corresponding parts throughout the several views.

FIG. 1 shows an arrangement 100 according to an embodiment of the present disclosure. The arrangement 100 has been set up at a soccer stadium for use during soccer matches. It will be appreciated that a soccer match is an example of a large scale public event. The soccer stadium comprises a soccer pitch 102, where the soccer match is actually played, together with stands 104A-D in which members of a live audience may sit and watch the soccer match. A plurality of cameras 106A-D are positioned around the soccer stadium. Although not shown, each of the cameras may be secured to a roof of the stadium, for example.

Each of the cameras is positioned so as to capture an image of one of the stands. Specifically, camera 106A is positioned so as to capture an image of the stand 104A, camera 106B is positioned so as to capture an image of the stand 104B, camera 106C is positioned so as to capture an image of the stand 104C, and camera 106D is positioned so as to capture an image of the stand 104D. The settings of each camera (focal length, depth of field, aperture, etc.) are set so that the stand substantially fills the frame of the captured image. Furthermore, the resolution of each camera is set so that relevant features (in particular, placards, as discussed below) can be readily identified in the captured image. The chosen resolution will depend on the distance of each camera from its respective stand, the size of the image features which must be identified, etc. For example, the resolution could vary from a standard-definition television (SDTV) resolution all the way up to a 20 megapixel or higher resolution, depending on the circumstances. Each of the cameras 106A-D may be configured to capture still or video images. In the case of video images, the processing described below may be applied to a single frame of a captured video image.

Figure 2:
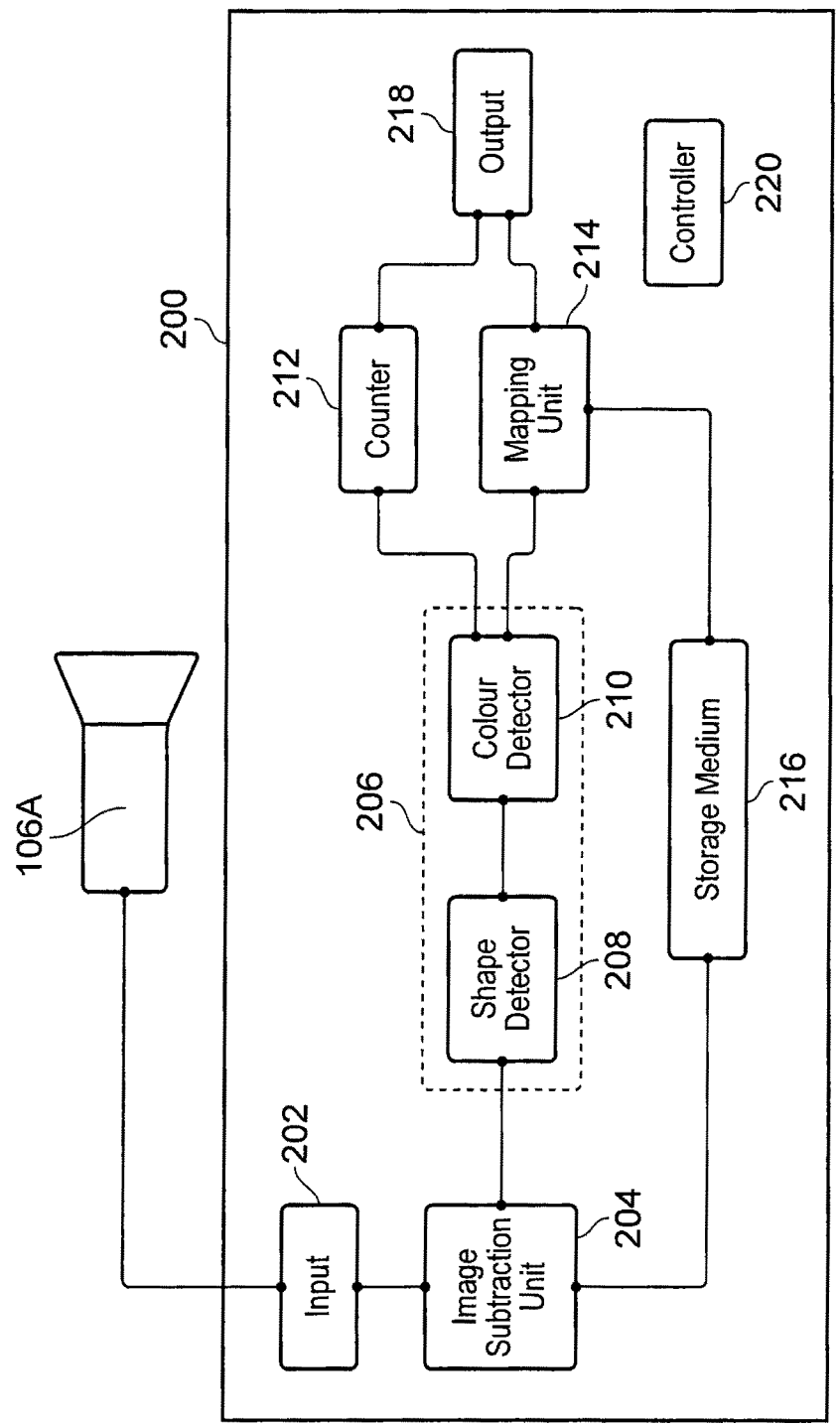
FIG. 2 describes an apparatus according to an embodiment.

FIG. 2 shows camera 106A connected to an apparatus 200 according to an embodiment of the present disclosure. Although the camera 106A is shown in FIG. 2, an equivalent set-up exists for each of the other cameras 106B-D. The cameras 106A-D may each be connected to the same apparatus 200. Alternatively, there may be multiple instances of the apparatus 200, each of these respectively connected to one of the cameras 106A-D.

The apparatus 200 comprises an input unit 202, an image subtraction unit 204, and detector 206 comprising a shape detector 208 and a colour detector 210, a storage medium 216, a counter 212, a mapping unit 214 and an output unit 218. The apparatus 200 further comprises a controller 220 which controls the operation of each of the other components.

As already mentioned, the camera 106A is set up so as to capture images of the stand 104A. In particular, the camera 106A is set up so as to capture images of the stand when audience members are present on the stand during a soccer match. In order to improve audience interaction during the event, audience members are provided with the device illustrated in FIG. 3.

Figure 3:
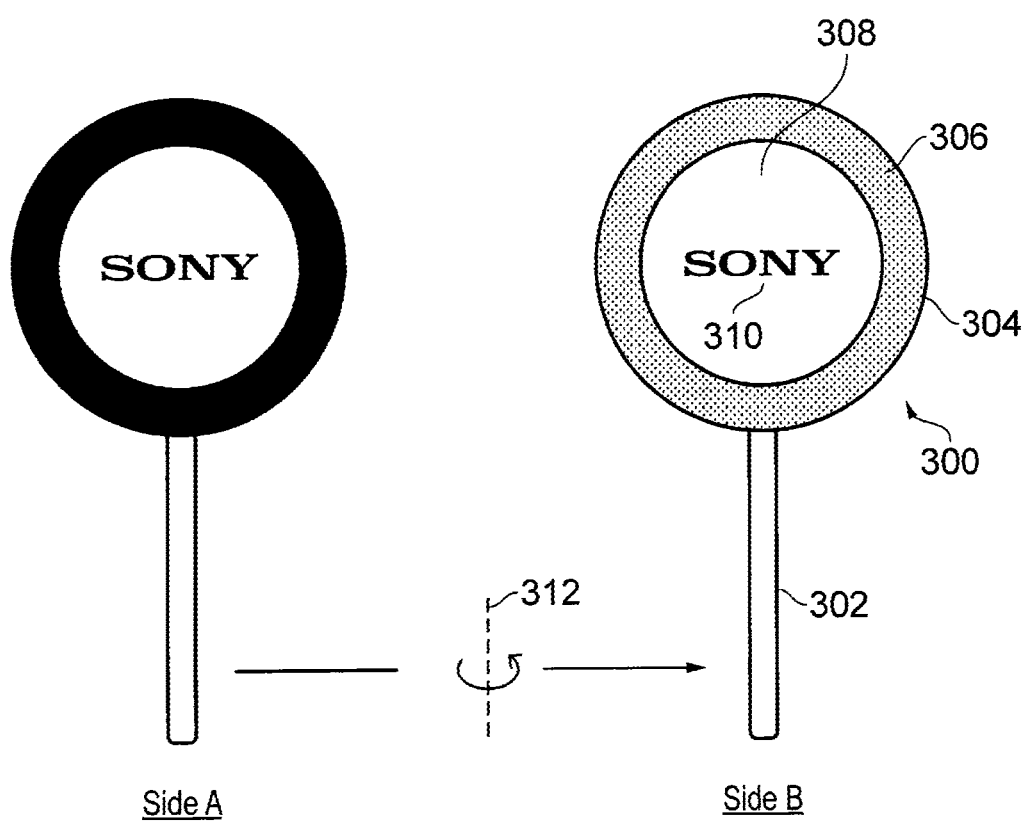
FIG. 3 describes a placard detectable by the apparatus in an image of the stadium captured by one of the cameras, according to an embodiment.

The device 300 illustrated in FIG. 3 comprises a grip portion 302, which is held in the hand of an audience member, and a placard 304 attached to the end of the grip portion 302. The placard is flat and circular in shape, and comprises a different coloured pattern on each of its sides (shown as side A and side B in FIG. 3). The device 300 is rotated about the axis 312 so that either side A or side B is visible at any one time. The coloured pattern on each side comprises a central circular region 308 in a first colour surrounded by a concentric circular ring 306 in a second colour, the second colour being different to the first. The coloured patterns on each side are different because at least one of the first and second colours on side A is different, respectively, to the first and second colours on side B. For example, as seen in FIG. 3, the colour of the concentric circular ring 306 of side B is different to the colour of the corresponding concentric circular ring of side A. The colour of the central circular region 308 is the same for side A and side B in FIG. 3. However, it will be appreciated that, in other embodiments, the colour of the central circular region could be different for side A and side B. As will be explained, the differences in the colours used for side A and side B should be chosen such that the different sides of the placard 304 can easily be distinguished in a captured image of the placard. Sponsorship information 310 (such as the company logo of a sponsor of the event) may also be included on the placards 304.

As an example of audience interaction with the device 300, consider a soccer game in which the referee must make a decision which affects the game. For example, the decision may relate to whether or not the ball has gone out of play (that is, whether or not the ball has crossed outside the line defining the boundary of the soccer pitch), whether or not a player has been fouled or whether or not a player has been caught offside. Due to the fast-paced nature of the game, such decisions are often difficult to make, and the referee is required to make quick judgement as to what the correct decision is. Audience members often have an opinion on what the correct decision should be, and thus improved audience interaction can be achieved if the audience members are allowed to vote on this. Of course, the real decision is still made by the referee. However, the participation of the audience and their enjoyment of the event can be improved by having such a voting system in place.

Thus, following an occurrence during the match such as a player being caught offside by the referee or a player being fouled, the opportunity may be given for audience members to cast their vote on what they think the correct decision should have been. In this case, an announcement may be made (using, for example, the existing audio/visual system of the stadium, which may incorporate a big screen display on which the announcement is displayed) which tells the audience the decision to be made and how they can vote using the device 300. For example, consider a placard 304 in which the colour of the concentric circular ring 306 is green on side A and red on side B. In this case, the announcement may say: "Was that a foul? Yes: Green or No: Red". The audience will then be given a short period of time (for example, 5 or 10 seconds) so that each member of the audience may hold up their device 300 with either side A (if they think that the answer is "yes") or side B (if they think that the answer is "no") of the placard 304 is visible to the relevant camera. The camera then captures an image of the audience for detection of the number of placards being held up by the audience.

The camera 106A will capture an image of the audience in stand 104A holding up their placards. This image is then received by the input unit 202 of the apparatus 200. The captured image is then passed to the image subtraction unit 204.

The image subtraction unit 204 subtracts a reference image from the captured image. The reference image is an image of the same scene as that of the captured image (so, for the camera 106A, the reference image is an image of the stand 104A), but is captured when there are no placards 304 visible in the scene. As will now be explained with respect to FIGS. 4A-C, this allows objects in the scene with a similar shape to that of the placards 304 to be removed from the captured image prior to detection of the placards, thus reducing the likelihood that objects (in particular, circular objects such as clock faces, etc.) are mistakenly identified as placards.

FIG. 4A shows a reference image RI of the stand 104A that is captured by the camera 106A when no placards 304 are held up by the audience members. It is seen that the stand 104A substantially fills the frame of the reference image RI. The reference image RI also comprises a circular clock face 402. Because the circular clock face 402 is similar in shape to that of the circular placards 304 that are to be held up by the audience, there is a danger that the clock face 402 may be mistakenly identified as a placard 304.

FIG. 4B shows the captured image CI of the audience holding up the placards 304. Apart from the existence of the placards 304, the captured image CI is an image of exactly the same scene as that of the reference image RI. This is achieved by ensuring that the position and settings (focal length, depth of field, aperture, resolution, etc.) of the camera 106A are exactly the same for both the reference image RI and captured image CI. Thus, as well as the placards 304, the captured image CI also includes the stand 104A and the clock face 402.

FIG. 4C shows the captured image CI after subtraction has been performed by the image subtraction unit 202. The image of FIG. 4C is generated by comparing each pixel of the reference image RI shown in FIG. 4A with the correspondingly positioned pixel in the captured image CI as originally captured shown in FIG. 4B. If the pixel value difference is less than a predetermined threshold (as will occur for objects appearing in both the reference image RI and the captured image CI), then the pixel value of the captured image CI is made to represent black (effectively removing the pixel information from the captured image CI). On the other hand, if the pixel value difference is greater than or equal to the predetermined threshold (as will occur when an object is present in the captured image CI but is not present in the reference image RI), then the pixel value of the captured image CI is left unaltered.

The result is that features of the captured image CI which were also present in the reference image RI are removed from the captured image CI. Thus, the clock face 402 and stand 104A are no longer present in the captured image CI shown in FIG. 4C. The placards 304 of the captured image CI remain, however, because these were not present in the reference image RI. Because of the removal of the non-placard features (in particular, the removal of the circular clock face 402), the danger of objects which are not placards being mistakenly identified as placards during placard detection processing (to be explained) is reduced. This helps to improve the accuracy of the detection of placards 304 in the captured image CI.

After the captured image CI has been processed by the image subtraction unit 204, the captured image is passed to the detector 206. More specifically, the image is first passed to the shape detector 208 and is then passed to the colour detector 210, wherein both the shape detector 208 and colour detector 210 are comprised within the detector 206.

The shape detector 208 performs a shape detection process on the captured image CI so as to detect objects in the captured image matching a predetermined shape of the placards 304. Thus, for the circular-shaped placard 304 shown in FIG. 3, the shape detector 208 will perform a process for detecting objects of a circular shape. Different shaped placards may be used for different events, and therefore, in this case, the shape detector 208 will be configured to detect the specific placard shape that is to be used prior to the start of an event. This configuration will be carried out by a user using a user interface (not shown) of the apparatus 200.

Figure 5A:
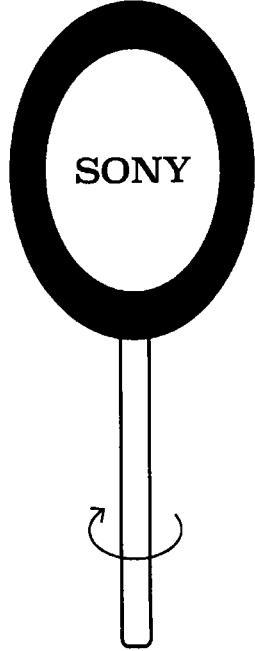
FIGS. 5A-C describe the appearance of the placard to one of the cameras when the placard is held non-parallel to the focal plane of the camera.
Figure 5B:
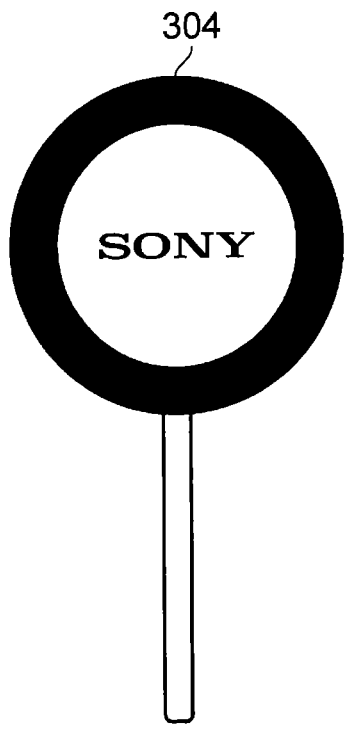
Figure 5C:
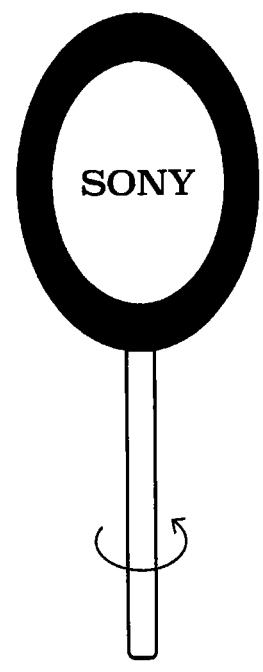

The process may be further extended to detect oval or elliptical shapes, in addition to detecting perfectly circular shapes. This is advantageous because, as illustrated in FIGS. 5A-C, the placards 304 held up by audience members may not appear to be perfectly circular in the captured image CI. Rather, as shown in FIGS. 5A and 5C, the circular shape of the placard 304 (as shown ideally in FIG. 5B) may actually appear to be oval or elliptical. This may arise because members of the audience do not hold their placard such that is it is parallel to the focal plane of the camera which captures the image (in fact, it is quite difficult for members of the audience to do this). This is illustrated in FIGS. 5A and 5C, in which a placard 304 may be held by an audience member such that it is rotated clockwise with respect to the focal plane of the camera (as shown in FIG. 5A) or anti-clockwise with respect to the focal plane of the camera (as shown in FIG. 5C). In both cases, the placard 304 will appear as an ellipse in the captured image rather than a circle. There may also be distortion effects of the camera lens which cause placards in the captured image to appear oval or elliptical, rather than circular. Thus, by detecting both circular and oval and/or elliptical shapes in the captured image, placards 304 in the captured image can be detected even if they are not parallel with respect to the focal plane of the camera or if they are distorted by imperfections in the camera lens. This allows for more accurate placard detection.

Any appropriate shape detection algorithm known in the art may be used for detecting objects matching the predetermined placard shape in the captured image. In addition, objects with a shape partially matching that of the predetermined placard shape may be detected by the shape detection algorithm. This will enable placards which are partially occluded (for example, by the head of an audience member of by another placard) to still be detected. It will then be confirmed as to whether or not such detected objects are actually placards during the subsequent colour detection (described below).

Once objects matching the predetermined shape of the placards 304 have been identified in the captured image CI, the captured image, together with data identifying the position of the detected objects in the captured image, is passed to the colour detector. The colour detector considers each of the objects detected by the shape detector and, on a basis of the colour of each object, determines whether or not each object actually corresponds to a placard. More specifically, as already discussed, each side of each placard 304 comprises a different coloured pattern. For each object detected by the shape detector, the colour detector is configured to determine whether or not one of the distinctive coloured patterns of the placard is present on the object. If one of the distinctive coloured patterns is present, then the object is determined to be a placard. On the other hand, if neither of the distinctive coloured patterns is present, then the object is determined not to be a placard. Once the colour detection has been applied to all objects in the captured image detected by the shape detector, data identifying the position of each object in the captured image which is determined to be a placard, together with data identifying the specific coloured pattern of each of those objects (that is, data identifying the specific coloured pattern of side A or the specific coloured pattern of side B), is passed to the counter 212 and mapping unit 214.

Again, any appropriate colour and/or pattern detection algorithm known in the art may be used for detecting which of the objects detected by the shape detector actually comprise one of the placard coloured patterns.

As an example, the shape and/or colour detector may make use of a feature finding vision processing algorithm such as a Harris corner finder or, alternatively, a Hough Transformation. These are only examples, however, and the skilled person would appreciate that any suitable known algorithm(s) could be used.

The coloured patterns used on each side of each placard 304 are chosen so as to be easily identifiable by the colour detector in the captured image. So, for example, coloured patterns which are unlikely to be found naturally on any object in the image which is not a placard may be chosen. In addition, specific colour combinations which remain easily identifiable and distinguishable from each other under different lighting conditions in the stadium may also be chosen. For example, for the placards shown in FIG. 3, side A of the placard may comprise a central circular region 308 which is black in colour and a surrounding concentric circular ring region 306 which is green in colour, and side B of the placard may comprise a central circular region 306 which is white in colour and a surrounding concentric circular ring region 306 which is red in colour. The coloured pattern of FIG. 3, used with these specific colour combinations, is easily identifiable by the colour detector 210. It also allows side A and side B coloured patterns to be easily distinguished from each other by the colour detector 210.

The counter 212 receives the data from the colour detector 210 identifying the position and identifying the specific coloured pattern (that is, the side A or the side B pattern) of each object in the captured image that is determined to be a placard. The counter 212 then counts the number of objects of each specific coloured pattern. That is, the counter 212 counts the number of objects determined to have the pattern of side A of the placard and counts the number of objects determined to have the pattern of side B of the placard. The counter 212 then passes the total number of objects with each pattern to the output unit 218.

The output unit 218 is configured to output the data of the total number of objects with each pattern to any suitable device (not shown) for further processing of the data. For instance, in the example given above (where a question is asked to the audience and the audience members are given an opportunity to vote using the placards 304), the data may be passed to a computer linked to an audio/visual system of the stadium, which is then able to generate an audio/video clip, image or the like informing the audience of the result of the vote. This gives quick, entertaining feedback to the audience on the result of the vote, thus providing improved audience participation. The data may also be transmitted to any other suitable device, such as to a server hosting a social media feed (such as Facebook® or Twitter®) so that the results of the vote can be known even by audience members watching the event remotely.

In addition to the counter 212, the apparatus 200 also includes a mapping unit 214, which is also configured to receive the data generated by the colour detector 210. The mapping unit 214 provides an extra level of functionality that goes beyond that of the counter 212 so as to provide even greater opportunities for audience participation. The mapping unit 214 achieves this by making it possible to map each individual placard to a respective seat in the stadium so that the votes of individual audience members can be tracked. This is explained in more detail below.

The mapping unit 214 is able to map each detected placard in a captured image CI by dividing the captured image into blocks, wherein each seat in the stadium is located within a respective block. The size and position of each of the blocks is determined using the reference image RI stored in the storage medium 216. During a set up process of the apparatus 200, the reference image RI is captured and stored, and the mapping unit 214 is used to divide the reference image RI into blocks so that each seat in the stadium is located within a respective block. The creation of the blocks and the mapping of each seat to a respective block are carried out by a user via a user interface (not shown) of the mapping unit 214, which displays the reference image RI to the user and which allows the user to overlay images of the blocks onto the reference image into order to correctly position the blocks.

Figure 6A:
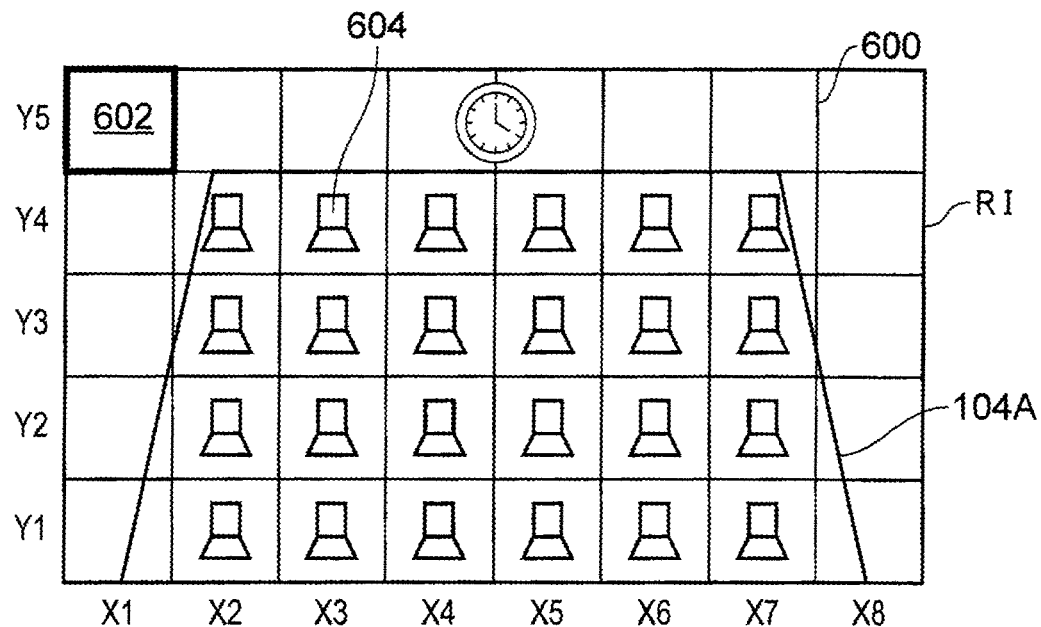
FIGS. 6A-B describe the association of each detected placard with a respective seat in the captured image, according to an embodiment.

This process is exemplified in FIG. 6A. In this case, a grid 600 is placed over the reference image RI so as to divide the reference image RI into blocks 602. The position of the grid 600 with respect to the reference image RI is changed and the grid 600 is made coarser or finer until each of the seats 604 captured in the reference image RI is located within one of the blocks 602. Once this has been done, a one-to-one mapping between a unique identifier of each seat 604 in the image (for example, row number and seat number) and a unique identifier of the block 602 in which the seat 604 is located is compiled. In the example of FIG. 6A, each block 602 is uniquely identified by a horizontal "X" coordinate and a vertical "Y" coordinate.

To be clear, each block 602 will contain a maximum of one seat. That is, each seat 604 must be located within a block 602 and no seats can be located within the same block. However, it is not necessary for all blocks to actually contain a seat (as will be the case if there are more blocks than seats when a grid is used to divide the captured image into blocks—see FIG. 6A, in which none of the blocks with vertical coordinate "Y5" actually contain a seat).

Figure 6B:
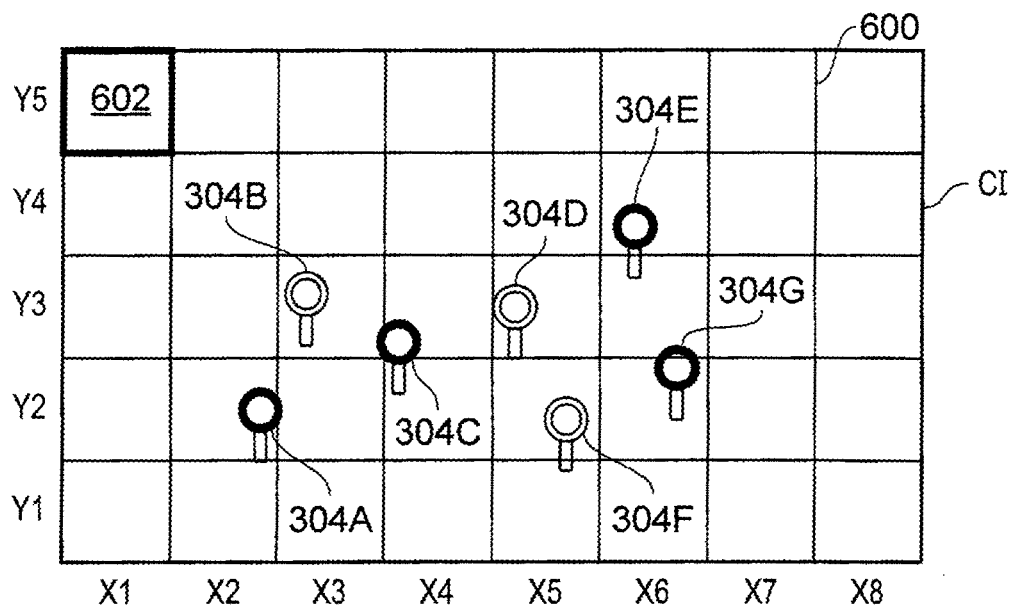

Once the one-to-one mapping between the seats 604 and the blocks 602 has been completed, data representing the grid 600 and the one-to-one mapping is saved with the reference image RI. Then, at a later time, when an image is captured of the audience holding up the placards 304, the mapping unit 214 applies the same grid 600 to the captured image CI. This is illustrated by FIG. 6B. It can be seen that each of the placards 304 is located within one of the blocks 602 of the grid. More specifically, the placard 304A is located within block (X2, Y2), the placard 304B is located within block (X3, Y3), the placard 304C is located within block (X4, Y3), the placard 304D is located within block (X5, Y3), the placard 304E is located within block (X6, Y4), the placard 304F is located within block (X5, Y2), and the placard 304G is located within block (X6, Y2).

There are some instances in which a placard in the captured image CI is not wholly contained within a block 602. For example, placard 304C is actually partially contained within multiple blocks, these being (X4, Y3), (X4, Y2) and (X3, Y3). However, in this case, the mapping unit 214 chooses a single block within which the placard is determined to be located. This is carried out on the basis of the number of pixels representing the detected placard within each block, so that the block in which the highest number of placard pixels are present is determined to be the block in which the placard is located. Thus, for placard 304C, although it is partially contained within multiple blocks, the majority of the pixels defining the placard 304C are within the block (X4, Y3). The placard 304C is thus determined to be within the block (X4, Y3).

Because the captured image CI is of exactly the same scene as that of the reference image RI, the one-to-one mapping of the seats and blocks of the reference image RI also applies to the captured image CI. This means that an individual placard (and the specific coloured pattern of the side of the placard shown, representing, for example, a "yes" or "no" vote) can be associated with a particular seat 604 in the stand 104A. This provides improved scope for audience interaction, because it allows all votes to be associated with a particular seat and therefore a particular person (of course, assuming that a person does not move to a different seat during the event).

An example of how this arrangement could be used to improve audience interaction will now be described with reference to FIG. 7. FIG. 7 shows a table of results generated during a game in which "true or false" style questions are provided to the audience (using the stadium's audio/visual system) and in which members of the audience are invited to vote on what they consider to be the correct answer. A "true or false" style question is a question in which a statement is made, and in which members of the audience must decide and vote on whether or not the statement is true. Such a game may be conducted at half time during a soccer match, for example, in order to help keep the audience entertained, and may contain questions related to the soccer match.

The game consists of 5 rounds, and in each of these rounds, a question is asked and the audience is given a period of time in which each member of the audience is allowed to vote on what they think the correct answer to the question is. During the voting time for each question, the audience members are instructed to hold up their placards 304 with either side A or side B visible to the camera 106A, with the side of the placard shown being indicative of a particular audience member's answer to the question (for example, side A in green if they believe that the answer is "true", or side B in red if they believe that the answer is false). During the voting time, an image is captured by the camera 106A and processed by the apparatus 200. Following processing of the captured image by the mapping unit 214 of the apparatus 200, each vote in the stand is allocated to a particular seat. This is possible due to the one-to-one mapping of the seats and blocks (exemplified by columns 1 and 2 of the table in FIG. 7).

The results of each round are recorded in the table shown in FIG. 7. At the end of the game (that is, after all 5 rounds are completed), the voting results associated with each seat are compared with a predetermined correct answer. In this case, it can be seen that the votes associated with the seat identified as Row 3 Seat 2 (shown as a highlighted row) match the correct answer for every round. Because the seat number has been identified, the audience member sitting in this seat can be identified as a winner of the game and awarded with a prize or the like.

The audience member sitting in the winning seat may simply be visually identified using video footage captured by one of the cameras 106A-D. Alternatively, purchase data could be used which relates each seat in the stadium with details of the audience sitting in that seat. This could be achieved, for example, through the use of a stadium membership card which is issued to members of the audience who wish to participate in games or the like using the placards 304. The membership card of a particular audience member is swiped or scanned when that audience member purchases a ticket and/or enters the stadium with a ticket so as to relate the seat number of the audience member (as printed on the ticket) with details of that particular audience member. The membership card will hold details such as a name, address and facial photo of the audience member so as to allow the audience member to be identified.

During each round, the data generated by the mapping unit 214 includes the seat identifier and the specific coloured pattern of the placard for each block 602 of the captured image within which a placard is detected. This data is then passed to the output unit 218 for output to an external device (not shown). The external device (which may again, for example, be a computer linked to the audio/visual system of the stadium) then generates the results table shown in FIG. 7 on the basis of this data. Furthermore, at the end of the game, the external device is able to generate an audio/video clip, image or the like informing the audience of the result of the game (including the identification of any winning seats). This gives quick, entertaining feedback to the audience following the end of the game, thus providing improved audience participation. The data may also be transmitted to any other suitable device, such as to a server hosting a social media feed (such as Facebook® or Twitter®) so that the result of the game can be known even by audience members watching the event remotely.

It is noted that, in reality, the block identifier shown in column 1 of the table of FIG. 7 would not need to be present, since the seat identifier generated by the mapping unit 214 and passed to an external device by the output unit 218 is sufficient information to allow the votes associated with each seat to be recorded. However, the inclusion of the block identifier column in the table of FIG. 7 serves to illustrate the one-to-one relationship between the blocks and seats that is determined by the mapping unit 214.

Figure 8:
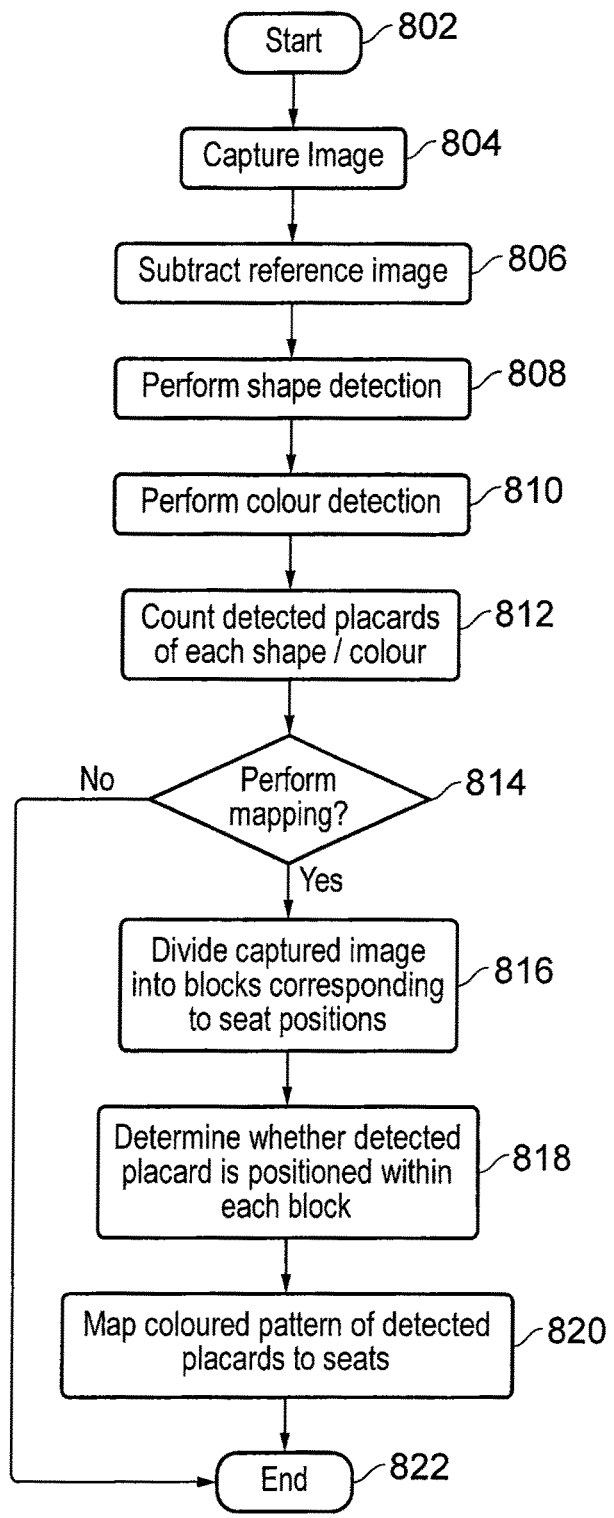
FIG. 8 shows a flow chart illustrating a process according to an embodiment.

FIG. 8 shows flow chart illustrating a process according to an embodiment of the present disclosure.

The process starts at step 802. At step 804, an image of audience members holding up placards is captured. At step 806, a reference image, which is an image of the same scene as that of the image captured at step 804, but which does not include any placards, is subtracted from the captured image. At step 808, shape detection is performed on the captured image so as to detect objects matching a predetermined shape of the placards. At step 810, colour detection is performed on the objects detected in step 808 so as to detect which of these objects have a coloured pattern matching one of a plurality of predetermined coloured pattern of the placards. At step 812, the number of objects detected at step 810 for each predetermined coloured pattern of the placards is counted.

The process then moves onto step 814, wherein it is decided as to whether or not mapping should be performed. This is determined by the controller of the apparatus 220 in accordance with instructions issued by a user, and depends on the way in which the placard data determined from the captured image is to be used. If the count performed in step 812 alone is sufficient for the user (for example, if voting results are required, but a determination of the vote associated with a particular seat is not required), then it is decided that no mapping should be performed, and the process ends at step 822. This reduces the amount of processing carried out by the apparatus 200. On the other hand, if mapping is required (for example, when a determination of the vote associated with a particular seat is required), then the process moves on to step 816.

At step 816, the captured image is divided into blocks so that each seat in the captured image is associated with a block in a one-to-one correspondence. Each seat is assumed to correspond to the position of a person in the audience. At step 818, it is determined as to which of the blocks of the captured image contain a detected placard. At step 820, the coloured pattern of each placard is mapped to the seat corresponding to the block within which the placard is detected. The process then ends at step 822.

Although, for simplicity, the above-mentioned embodiment relates only to the camera 106A (which captures images of the stand 104A), it will be appreciated that the same process is also carried out for each of the cameras 106B-D using an apparatus 200. The results generated from each camera are then collated by an external device (not shown), such as a computer connected to the output unit 218 of each apparatus 200 used, so as to give an overall result.

So, for example, when counting up the number of placards of each different coloured pattern during an audience vote (with, for example, side A indicating "yes" and side B indicating "no"), the number of placards of each different coloured pattern detected for each camera are summed together to give a total number of placards of each different coloured pattern for the entire stadium. In other words, the total number of side A placards for the stadium (which includes all stands 104A-D) is calculated by summing the number of detected side A placards from images captured by each of the cameras 106A-D. Similarly, the total number of side B placards for the stadium is calculated by summing the number of detected side B placards from images captured by each of the cameras 106A-D. This allows the total number of placard votes from all areas of the stadium to be counted.

Also, when the one-to-one mapping of seats and blocks is used for each stand 104A-D, thus allowing each detected placard and its coloured pattern to be associated with a particular seat in the stand (and hence allowing a game such as that described with reference to FIG. 7 to be implemented), additional data may be used so as to identify the stand and/or camera with which the data representing the seat identifier and specific coloured pattern of each placard is associated. This ensures that the seat position of each placard in the stadium can be uniquely identified, even if the seat identifier takes the same format in different stands (for example, a format comprising a row number and seat number, meaning that two seats in different respective stands might actually have the same identifier). The additional data identifies the stand (that is, stand 1, 2, 3 or 4) to which the seat and colour data generated by the mapping unit 214 relate, and may, for example, be added at the external device which collates the data from each camera or at the output unit 214 of appropriate apparatus 200 (under control of the controller 220). Thus, the final data associated with each detected placard will be of the format (Stand Number, Row Number, Seat Number, Placard Colour). The seat position of each placard in the stadium and its specific coloured pattern can therefore be uniquely identified.

It will appreciated that although, in the above-mentioned embodiments, the placards are circular in shape and have the example coloured patterns described with reference to FIG. 3, the apparatus may he set up to detect placards of any shape and/or colour for the use as described. For example, as long as the shape of the placard is detectable by the shape detector 208, and the possible colours of the placard are detectable and distinguishable from each other by the colour detector 210, then the apparatus 200 will be able to successfully detect placards in the captured image in the way described. The term "colour" of a placard may relate to any solid colour, any combination of colours and or any coloured pattern (of one or more colours) which is detectable by the colour detector 210. It is also envisaged that the audience may have access to different placards of different shapes, each of these shapes being detectable by the shape detector 208. In the case of a plurality of different shaped placards being available to the audience, the counter 212 and/or mapping unit 214 may be configured to distinguish placards on the basis of shape instead of or in addition to on the basis of colour. Thus, for example, in an alternative embodiment, the audience could hold up a circular-shaped placard for a "yes" vote and a square-shaped placard for a "no" vote. Both of these shapes would be detectable by the shape detector 208, and the counter 212 would then count the number of circular-shaped placards for the determination of the number of "yes" votes and the number of square-shaped placards for the determination of the number of "no" votes. The shape detector 208 and colour detector 210 may be configured to detected any suitable placard shape(s) and colour(s) (respectively) prior to the start of a particular event by a user via using interface (not shown) of the apparatus 200.

It will appreciated that although, in the above-mentioned embodiments, an image is captured of an entire stand 104A-D by each respective camera 106A-D, an alternative for counting the number of placards is that the settings of each camera are set so that only a portion of the stand appears in the image frame. Advantageously, this allows a more detailed (zoomed-in) image of the captured portion of the stand (assuming adequate image resolution), thus improving the accuracy of placard detection. In this case, each camera is slowly panned across its respective stand and a plurality of images is captured as the camera is panned so that each captured image is an image of a different portion of the stand. The camera panning speed and range and the image capture frequency are predetermined so that every part of the stand is captured in at least one image. This means that all placards held up during the time period over which the camera is panned can be captured in an image and then detected and counted. In this case, motion tracking technology (known in the art) may be used to ensure that placards which appear in more than one captured image are not counted more than once by the counter 212.

In an alternative arrangement, the settings of each camera may be set so that only a portion of the stand corresponding to premium seating (that is, seats which are more expensive for customers because they have additional benefits) appears in the image frame. This would limit aspects of audience participation such as voting and game-playing using the placards 304 to audience members who have purchased premium seats.

The camera arrangement 100 shown in FIG. 1 may be provided as a kit which is temporarily fitted to a stadium so as to improve audience participation for a particular event (for example, for a particular music performance or a one-off sporting event). Alternatively, if a stadium is used frequently for the same type of event (for example, league soccer), then the camera arrangement 100 may be permanently installed, thus allowing improved audience participation for all of these events. It is also noted that although four cameras are shown in FIG. 1, any number of cameras may be used. The number of cameras used will depend on the characteristics, architecture, etc. of the stadium. It is also not necessary that the number of cameras matches the number of stands at the stadium. For example, there may be more than one camera for each stand, or a single camera for use with multiple stands.

It will be appreciated that although, in the above-mentioned embodiments, the apparatus 200 comprises the image subtraction unit 204 for performing image subtraction of a captured image CI using a reference image RI, the image subtraction unit 204 may, in fact, be omitted. In this case, placard detection will take place on an unedited version of the captured image CI solely using the shape detector 208 and colour detector 210. Nonetheless, in this case, objects in the captured image CI will still only be detected as placards 304 if they match both a predetermined placard shape and predetermined placard colour. Thus, even though there may be similarly-shaped, non-placard objects in the captured image CI (due to the lack of a subtraction step), the processing of the shape detector 208 and colour detector 210 is still likely to exclude most (if not all) of these objects, since they are unlikely to offer a sufficient match to the predetermined shape(s) and/or colour(s) of the placards 304 which the shape detector 208 and/or colour detector 210 are configured to detect. A high quality placard detection process is therefore maintained, even in the absence of image subtraction unit 204.

In an embodiment, instead of having a specific device 300 comprising a placard 304 made of, for example, cardboard or wood, the placard 304 may be a virtual placard which appears as part of a digital image which is displayed on the screens of personal electronic devices such as smartphones, tablets or the like. It is the devices themselves which are then held up by the audience members during a vote or game so that the screens of these devices are visible to the cameras 106A-D. The virtual placard in the digital image will still have a shape and colour which is detectable by the shape detector 208 and colour detector 210. The digital image may be downloaded by a device prior to the beginning of the event in order to allow the audience member who owns the device to have access to the placard image. The placard may be made available as part of a software application (or "app") which is downloadable by the audience member and which comprises all necessary placard images (for example, an image comprising a green placard for a "yes" vote and another image comprising a red placard for a "no" vote) and which allows the audience member to easily select the placard image that they require. Advantageously, this removes the need to produce printed devices 300 (thus reducing cost and environmental waste) and also allows new placard shapes and colours (for different events, etc.) to be quickly made available (for example, via download) to audience members.

In an embodiment, in addition to placards 304 in the live audience at an event being used to count votes during a voting session or game, audience members viewing the event remotely (for example, via television or the internet) may also take part in the voting. In this case, the votes of the remote audience may be collated in response to each remote audience member submitting, for example, a "yes" or "no" vote using a television remote control (by pressing a green remote control button for "yes" or a red remote control button for "no", for example), an internet webpage (by clicking a "yes" or "no" button, for example) or a smartphone/tablet app (by pressing a virtual "yes" or "no" button on the touch screen of a smartphone, for example). These remote votes will then be sent to the same external device (not shown) which receives data from the output unit 218 of the apparatus 200 for analysis and, if appropriate, for comparison with the live audience votes.

This could lead to interesting comparisons between the votes of the live and remote audience regarding, for example, the decision of a referee during a soccer game regarding whether or not a player was fouled or whether or not the ball went out of play (of course, the live audience would see the actual event, where as the remote audience would see only images of the event, and thus their perceptions of the event might be different). In this case, the proportion or percentage of "yes" and "no" votes from both the live and remote audiences could be compared, thus providing improved audience interaction for both the live and remote audiences. It is also envisaged that the voting results of individual stands in the stadium could be compared in a similar way (thus seeing, for example, which of groups of audience members in the respective stands 104A-D provide the most correct results when a game of the sort shown in FIG. 7 is played).

The skilled person would appreciate that there are many ways in which the voting data from both the live and/or remote audience could be analysed and compared.

Figure 9:
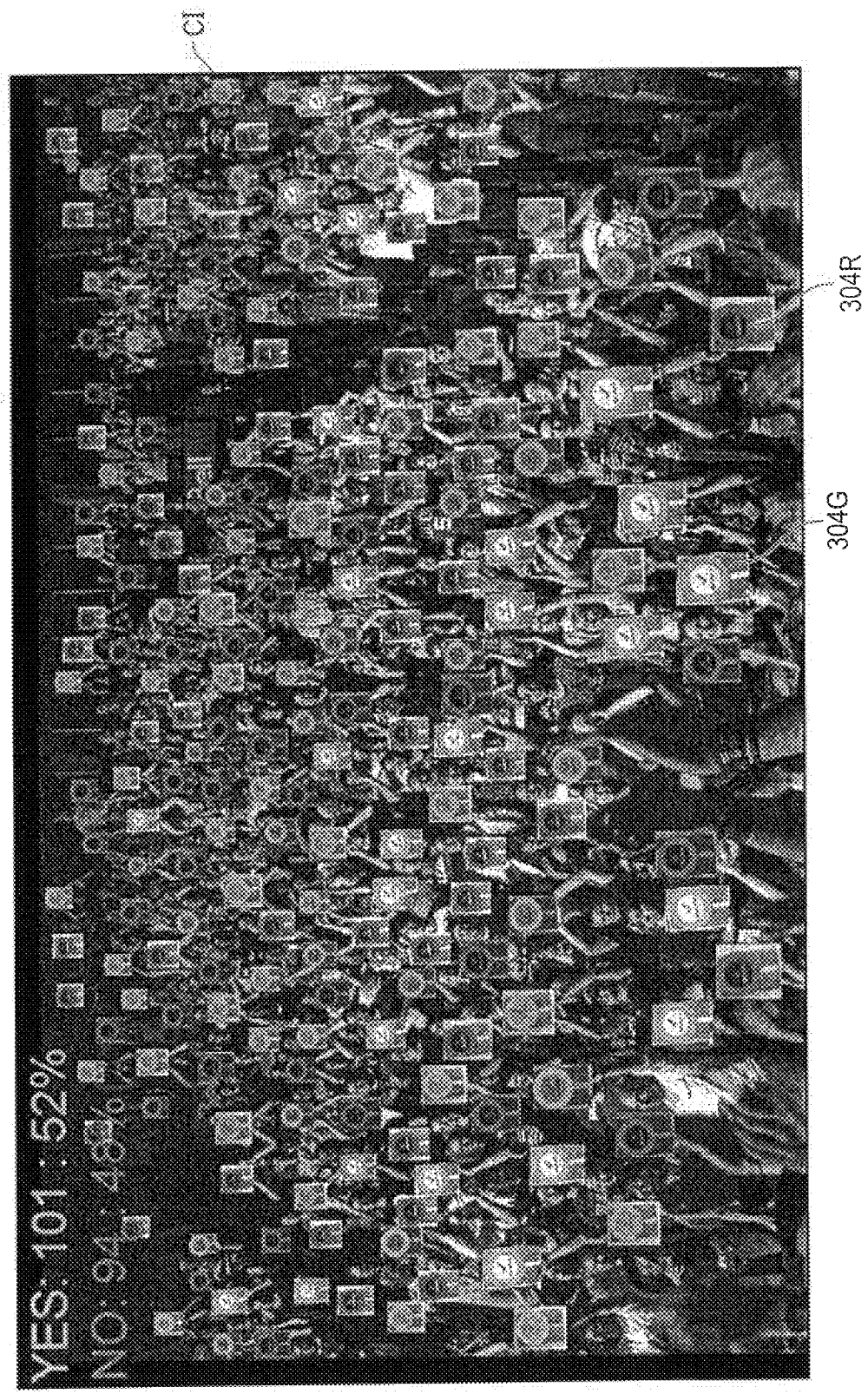
FIG. 9 shows an image representing a real-life captured image of audience members during a vote using placards, according to an embodiment.

FIG. 9 shows an image representing a real-life captured image CI of audience members during a vote using placards 304, according to an embodiment. It can be seen that only a portion of the stand is included in the frame of the captured image CI, and that therefore this represents the use of the zoomed-in, panning camera method mentioned above (rather than the full frame method in which the entire stand is included within the frame of the captured image CI, as described with reference to FIGS. 4A-C).

In FIG. 9, it can be seen that green and white circular placards 304G and red and black circular placards 304R represent a "yes" and "no" vote, respectively. The particular event in this case is a tennis match, and the question that has been asked of the live audience relates to whether or not the ball should or should not have been called out by the umpire (that is, the question is "Was the ball out"?). It can be seen that 101 green placards have been detected (representing 52% of all detected placards) and 94 red placards have been detected (representing 48% of all placards) for this portion of the audience by the apparatus 200. The winning vote of this portion of the audience is therefore a "yes" vote. In a tennis match which makes use of an electronic ball-tracking system in order to aid in decisions of the umpire (for example, the system by Hawk-Eye®), the audience placard vote can be conducted, counted and reported to the audience using the apparatus 200 before the decision of the electronic ball-tracking system is reported. This allows the vote of the audience and the result of the electronic ball-tracking system to be compared and provides excitement to the audience when the result of the audience vote is known but the result of the electronic ball-tracking system is still being awaited.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Clauses

Further embodiments of the disclosure are defined by the following clauses:

1. An apparatus for detecting placards in a captured image, comprising:
    input circuitry operable to receive the captured image;
    detector circuitry operable to detect placards in the captured image on a basis of a predetermined shape and/or colour of the placards, the detector circuitry being operable to detect placards of a plurality of different shapes and/or colours; and
    counter circuitry operable to count a number of detected placards of each different shape and/or colour.
2. An apparatus according to clause 1, wherein the detector circuitry comprises shape detector circuitry operable to detect objects in the captured image matching a predetermined placard shape, and colour detector circuitry operable to detect which of the objects detected by the shape detector circuitry match a predetermined placard colour, wherein an object detected by the colour detector circuitry is determined to be a detected placard.
3. An apparatus according to clause 2, wherein there is a single predetermined placard shape, and a plurality of different predetermined placard colours, wherein the counter circuitry is operable to count the number of detected placards of each different predetermined placard colour.
4. An apparatus according to clause 3, wherein the single predetermined placard shape is a circle, oval or ellipse, and each predetermined placard colour is different coloured pattern, each coloured pattern comprising a central circular, oval or elliptical region in a first colour surrounded by a circular, oval or elliptical ring in a second, different colour.
5. An apparatus according to any preceding clause, comprising:
    a storage medium operable to store a reference image of the same scene as that of the captured image, wherein no placards are present in the reference image; and
    image subtraction unit circuitry operable to subtract the reference image from the captured image prior to detection of placards in the captured image by the detector circuitry.
6. An apparatus according to any preceding clause, wherein the captured image is an image of seats in a stadium, and the apparatus comprises mapping circuitry operable to:
    divide the captured image into a plurality of blocks, wherein each seat in the image corresponds to a respective block;
    for each block, determine whether or not a detected placard is positioned within the block; and
    for each block in which a detected placard is determined to be positioned, map the seat corresponding to the block to the shape and/or colour of the detected placard.
7. A system comprising:
    an apparatus according to any preceding clause; and
    a camera operable to capture an image and to transmit the captured image to the input circuitry of the apparatus.
8. A system according to clause 7, wherein the camera is located at an event with an audience and is operable to capture an image of one or members of the audience each holding up a placard.
9. An method for detecting placards in a captured image, comprising:
    receiving the captured image;
    detecting placards in the captured image on a basis of a predetermined shape and/or colour of the placards, wherein placards of a plurality of different shapes and/or colours are detected; and
    counting a number of detected placards of each different shape and/or colour.
10. A method according to clause 9, wherein the detecting step comprises detecting objects in the captured image matching a predetermined placard shape, and detecting which of the detected objects matching a predetermined placard shape match a predetermined placard colour, wherein a detected object matching a predetermined placard colour is determined to be a detected placard.
11. A method according to clause 10, wherein there is a single predetermined placard shape, and a plurality of different predetermined placard colours, wherein the counting step comprises counting the number of detected placards of each different predetermined placard colour.
12. A method according to clause 11, wherein the single predetermined placard shape is a circle, oval or ellipse, and each predetermined placard colour is different coloured pattern, each coloured pattern comprising a central circular, oval or elliptical region in a first colour surrounded by a circular, oval or elliptical ring in a second, different colour.
13. A method according to any one of clauses 9-12, comprising:
    subtracting a reference image from the captured image prior to detection of placards in the captured image, wherein the reference image is an image of the same scene as that of the captured image, wherein no placards are present in the reference image.
14. A method according to any one of clauses 9-13, wherein the captured image is an image of seats in a stadium, and the method comprises:
    dividing the captured image into a plurality of blocks, wherein each seat in the image corresponds to a respective block;
    for each block, determining whether or not a detected placard is positioned within the block; and
    for each block in which a detected placard is determined to be positioned, mapping the seat corresponding to the block to the shape and/or colour of the detected placard.
15. A program for controlling a computer to perform a method according to any one of clauses 9-14.
16. A recording medium storing a program according to clause 15.
17. An apparatus, system or method as substantially hereinbefore described with reference to the accompanying drawings.

The invention claimed is:

1. An apparatus for detecting placards in a captured image, comprising:
    input circuitry configured to receive the captured image;
    detector circuitry configured to detect placards in the captured image matching a predetermined placard shape and detect which of the detected placards match each of a plurality of different predetermined placard colors; and counter circuitry operable to count a number of detected placards of each different predetermined placard color.

2. The apparatus according to claim 1, wherein the predetermined placard shape is a circle, oval or ellipse, and each different predetermined placard colour is a different colored pattern, each colored pattern comprising a central circular, oval or elliptical region in a first color surrounded by a circular, oval or elliptical ring in a second, different color.

3. The apparatus according to claim 1, comprising:
a storage medium configured to store a reference image of the same scene as that of the captured image, wherein no placards are present in the reference image; and
image subtraction circuitry configured to subtract the reference image from the captured image prior to detection of placards in the captured image by the detector circuitry.

4. The apparatus according to claim 1, wherein the captured image is an image of seats in a stadium, and the apparatus comprises mapping circuitry configured to:
divide the captured image into a plurality of blocks, wherein each seat in the image corresponds to a respective block;
for each block, determine whether or not a detected placard is positioned within the block; and
for each block in which a detected placard is determined to be positioned, map the seat corresponding to the block to the color of the detected placard.

5. A system comprising:
an apparatus according to claim 1; and
a camera configured to capture an image and to transmit the captured image to the input circuitry of the apparatus.

6. The system according to claim 5, wherein the camera is located at an event with an audience and is configured to capture an image of one or members of the audience each holding up a placard.

7. The method for detecting placards in a captured image, comprising:
receiving the captured image;
detecting placards in the captured image matching a predetermined placard shape;
detecting which of the detected placards match each of a plurality of different predetermined placard colors; and
counting a number of detected placards of each different predetermined placard color.

8. The method according to claim 7, wherein the predetermined placard shape is a circle, oval or ellipse, and each different predetermined placard colour is a different colored pattern, each colored pattern comprising a central circular, oval or elliptical region in a first color surrounded by a circular, oval or elliptical ring in a second, different color.

9. The method according to claim 7, comprising:
subtracting a reference image from the captured image prior to detection of placards in the captured image, wherein the reference image is an image of the same scene as that of the captured image, wherein no placards are present in the reference image.

10. The method according to claim 7, wherein the captured image is an image of seats in a stadium, and the method comprises:
dividing the captured image into a plurality of blocks, wherein each seat in the image corresponds to a respective block;
for each block, determining whether or not a detected placard is positioned within the block; and
for each block in which a detected placard is determined to be positioned, mapping the seat corresponding to the block to the color the detected placard.

11. A non-transitory computer readable medium including computer program instructions, which when executed by a computer causes the computer to perform the method of claim 7.

* * * * *